United States Patent [19]

Vaughan et al.

[11] Patent Number: 4,931,267

[45] Date of Patent: Jun. 5, 1990

[54] PROCESS FOR PREPARING A HIGH SILICA ZEOLITE HAVING THE FAUJASITE TOPOLOGY, ECR-32

[75] Inventors: David E. W. Vaughan, Flemington; Karl G. Strohmaier, Port Murray, both of N.J.

[73] Assignee: Exxon Research and Engineering Company, Florham Park, N.J.

[21] Appl. No.: 355,616

[22] Filed: May 23, 1989

Related U.S. Application Data

[63] Continuation-in-part of Ser. No. 122,789, Nov. 19, 1987, abandoned.

[51] Int. Cl.$^5$ ............................................. C01B 33/28
[52] U.S. Cl. ......................................................... 423/328
[58] Field of Search ............... 423/326, 328, 329, 330, 423/331, 332; 502/79, 164

[56] References Cited

U.S. PATENT DOCUMENTS

| | | | |
|---|---|---|---|
| 3,415,736 | 12/1968 | Ciric | 423/328 |
| 3,433,589 | 3/1969 | Ciric et al. | 423/328 |
| 3,574,538 | 4/1971 | McDaniel et al. | 423/328 |
| 3,639,099 | 1/1972 | Elliott Jr. et al. | 423/328 |
| 3,642,434 | 2/1972 | Dwyer | 423/328 |
| 3,671,191 | 6/1972 | Maher et al. | 423/328 |
| 3,972,983 | 8/1976 | Ciric | 423/328 |
| 4,714,601 | 12/1987 | Vaughan | 423/328 |

*Primary Examiner*—John Doll
*Assistant Examiner*—R. Bruce Breneman
*Attorney, Agent, or Firm*—Ronald D. Hantman

[57] ABSTRACT

A faujasite polymorph having a silica to alumina ratio greater than 6, and containing tetrapropyl ammonium and/or tetrabutyl ammonium trapped within the supercages of said structure.

8 Claims, 3 Drawing Sheets

PROCESS FOR PREPARING A HIGH SILICA ZEOLITE HAVING THE FAUJASITE TOPOLOGY, ECR-32

CROSS REFERENCE TO RELATED APPLICATIONS

This is a continuation-in-part of U.S. Ser. No. 122,789, filed Nov. 19, 1987 now abandoned.

FIELD OF THE INVENTION

The present invention relates to the directly synthesized high silica polymorph, designated as ECR-32, having the faujasite structure and containing organic tetrapropyl and, or tetrabutyl ammonium ions. It also relates to a process for preparation of the zeolite. It may be employed in catalytic, absorbent or separation applications, particularly in cracking and hydrocracking catalysts.

BACKGROUND OF THE INVENTION

Large pore zeolites with high silica to alumina ratios, i.e., of at least six, are desirable because of their particular catalytic selectivity and their thermal stability; the latter is a property particularly important when the zeolite is used as catalyst or in adsorption procedures wherein exposure to high temperatures would be expected. Although faujasites zeolites having silica to alumina ratios of less than six can be readily synthesized by a variety of methods, as disclosed, e.g., in U.S. Pat. Nos. 2,882,244 and 4,178,352: Methods for preparing faujasite polymorphs of higher ratios generally involve several weeks of crystallization and result in poor yields of product, as reported by Kacirek, *J. Phy. Chem.*, 79, 1589 (1975). One successful method results in a high silica faujasite that contains $Cs^+$ cations trapped within the sodalite cage subunits of the structure and has a composition $(Na, Cs)_2O: Al_2O_3: 5-7 SiO_2$; See U.S. Pat. No. 4,333,859. However, to remove the trapped Cs cations, several exchange and calcination treatments are required The use of quaternary ammonium salts as templates or reaction modifiers in the preparation of synthetic crystalline aluminosilicates (zeolites), first discovered by R. M. Barrer in 1961, has led to preparation of zeolites with high silica to alumina ratios which are not found in nature. For example, U.S. Pat. No. 4,086,859 discloses preparation of a crystalline zeolite thought to have the ferrierite structure (ZSM-21) using a hydroxyethyl-trimethyl sodium aluminosilicate gel. A review provided by Barrer in *Zeolites*, Vol. I, p. 136 (October, 1981) shows the zeolite types which are obtained using various ammonium organic bases as cation. In addition, Breck, *Zeolite Molecular Sieves*, John Wiley (N.Y., 1974), pp. 348-378, provides a basic review of zeolites obtained using such ammonium cations in the synthesis thereof, as does a review by Lok et al (Zeolites, 3, p 282, 1983)).

The Si/Al ratios of a variety of readily synthesized NaY materials ($SiO_2/Al_2O_3 < 6$) can be increased by a wide range of chemical or physical chemical treatments. However, these processes usually involve removal of Al from the zeolite framework and creation of a metastable defect structure, followed by filling the defects with Si from another part of the structure by further chemical treatments or hydrothermal annealing. Typical treatments use steam, e.g., U.S. Pat. No. 3,293,192; acid leaching, e.g., U.S. Pat. No. 3,506,400; treatments with EDTA, e.g., U.S. Pat. No. 4,093,560; treatment with $SiCl_4$ (Beyer and Belenyakja, *Catalysis by Zeolites* S, p. 203 (1980), Elsevier Press.); treated with $CHF_3$, i.e., U.S. Pat. No. 4,275,046; or treated with other chemicals. The products are often called 'ultra stable' faujasites (cf. Maher and McDaniel Proceedings Intl. Conference on Molecular Sieves, London, 1967) because of their very high thermal and hydrothermal stability. However, such chemical processing often yields variable products, requires multi-step processing, often using highly corrosive environments, and usually involves a yield debit in the form of partly collapsed or blocked zeolite product. Few of the modified materials have the product quality of the starting sample because the process of modification involves partial destruction of the lattice and/or deposition of detrital reaction products within the pores of the structure. This usually results in the development of a secondary meso pore structure (Lohase et al, Zeolites, 4, p 163 (1984)) which, although of some catalytic interested, will be less controlled and selective then the parent structure. Other methods of so called secondary synthesis using $(NH_4)_2 SiF_6$ in aqueous solution have also been demonstrated to yield higher silica zeolites (U.S. Pat. No. 4,503,023). Methods of directly synthesizing high silica faujasites would therefore be useful in optimizing both the zeolite product and the process for its production.

Although the disclosed ECR-32 composition is quite thermally stable in its own right because of its high silica content, that thermal stability makes the inventive composition particularly useful as a starting material for the dealumination processes described above. Since the number of aluminum atoms in the framework of the inventive composition is lower than in zeolite Y, removal of these atoms causes less framework metastability during dealumination, allowing the formation of near pure silica faujasites.

The use of tetramethyl ammonium cations (TMA) in the synthesis of zeolites A, Y and ZSM-4 (mazzite) is known, e.g., U.S. Pat. Nos. 3,306,922; 3,642,434; 4,241,036 and 3,923,639. In all these cases the TMA is trapped in the smaller cavities in the structures (sodalite or gmelinite cages), and must be burned out at high temperatures, often leading to lattice disruption and collapse. In most of these syntheses the $SiO_2/Al_2O_3$ ratio of the zeolites is less than about 6.

It is also known that even minor changes in the size or charge distribution of these large organic cations can induce the formation of different zeolite structures. U.S. Pat. No. 4,046,859 teaches that replacement of one of the methyl groups of the TMA compound with a hydroxy ethyl group causes the formation of a ferrierite-like phase (ZSM-21). Many such examples are enumerated by Barrer (Zeolites, 1981). The objective of the present invention is to develop faujasite preparation methods yielding high silica materials, where the organic templates are not locked into the small cavities in the structure, but are instead present in the large "super cages" from which they can be readily removed without disruption and degradation of the host lattice. One such group of faujasite polymorphs designated ECR-4 (co-pending U.S. application Ser. No. 606,940), now U.S. Pat. No. 4,714,601 is made with a variety of "unbalanced" alkyl ammonium cations.

SUMMARY OF THE INVENTION

According to the present invention a high silica crystalline polymorph (zeolite), designated for convenience herein as ECR-32, having the faujasite structure and a $SiO_2/Al_2O_3$ mole ratio of at least six can be readily prepared which contains organic templates of tetrapropyl and/or tetrabutyl ammonium ions, within the large cages of the aluminosilicate. The chemical composition for this zeolite, expressed in terms of mole ratios of oxides, is in the range:

0.2 to 0.8 $T_2O$:0.2 to 0.8$Na_2O$:$Al_2O_3$:6 to 15$SiO_2$:$xH_2O$ wherein T represents tetrapropyl and or tetrabutylammonium organic cation, and x represents O or an integer from 1 to 25, depending on composition and degree of hydration. The more preferred composition for the zeolite is in the range: 0.4 to 0.8 $T_2O$:0.2 to 0.6 $Na_2O$:$Al_2O_3$:6 to 12 $SiO_2$:$xH_2O$. The most preferred composition has the same molar oxide ratio as does the more preferred composition save the $SiO_2/Al_2O_3$ ratio which is 8 to 12.

The aluminosilicate herein may be used as a sorbent or as a catalyst, e.g., as a hydrocarbon conversion catalyst for, e.g., cracking, hydrocracking, reforming, paraffin isomerization, aromatization, and alkylation. When the product is used as a catalyst, it may be exchanged with cations from Groups II through VIII of the Periodic Table to remove the excess sodium ions which may be undesirable. Even after this ion exchange some of the alkyl or hydroxyalkylammonium cations will remain trapped in the super cages of the faujasite structure. Those cations may be removed by calcination.

In another embodiment of this invention the novel aluminosilicate may be prepared by a process comprising:

(a) preparing a reaction mixture comprising an oxide of sodium, a tetrapropyl or hydroxypropyl (or similar tetrabutyl) ammonium salt, water, a source of silica, a source of alumina, and sodium aluminosilicate nucleating seeds, said reaction mixture having a composition, in terms of mole ratios of oxides, within the following ranges:

| | |
|---|---|
| $(Na,T)_2O$:$Al_2O_3$ | 3 to 15 |
| $SiO_2$:$Al_2O_3$ | 9 to 36 |
| $H_2O$:$Al_2O_3$ | 120 to 500 | where T represents a tetra-alkyl or hydroxyalkyl ammonium cation, and said seeds being present in an amount to yield 0.1 to 10 mole percent of the total final alumina content in said aluminosilicate;

(b) blending the reaction mixture sufficiently to form a substantially homogeneous mixture;

(c) maintaining the reaction mixture at a temperature between about 90° C. and 160° C. under autogenous pressure for a sufficient period of time to form crystals of the aluminosilicate; and (d) recovering the ECR-32 aluminosilicate crystals.

It will be understood that the compositions herein may contain some waters of hydration (the x value above) which may be at least partially removed when the zeolites are employed as sorbents or catalysts.

DESCRIPTION OF THE PREFERRED EMBODIMENTS

The aluminosilicate herein generally will have the formula, in terms of mole ratios of oxides, in the range:

0.2 to 0.8 $T_2O$:0.2 to 0.8 $Na_2O$:$Al_2O_3$:6 to 15 $SiO_2$:$xH_2O$ or preferably 0.40 to 0.80 $T_2O$:0.2 to 0.6 $Na_2O$:$Al_2O_3$:8 to 12 $SiO_2$:$H_2O$ where x is 0–20 and T is an tetrapropyl ammonium carbon.

Figure 2:
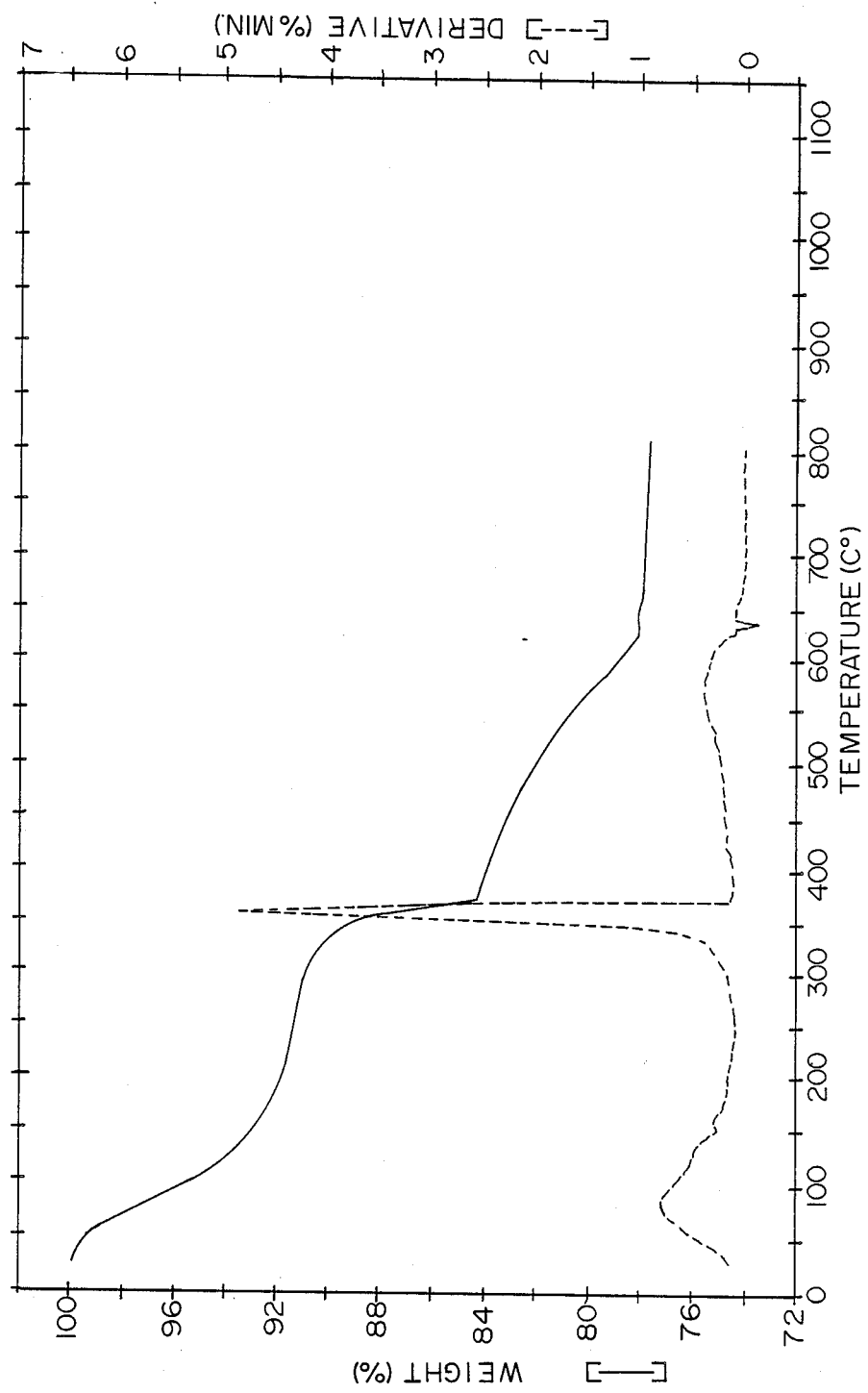
FIG. 2 shows weight loss curves (loss rate and total weight loss) as a function of temperature for ECR-32 containing tetrapropyl ammonium ions in the faujasite super cage. (Product of Example 1.)
Figure 3B:
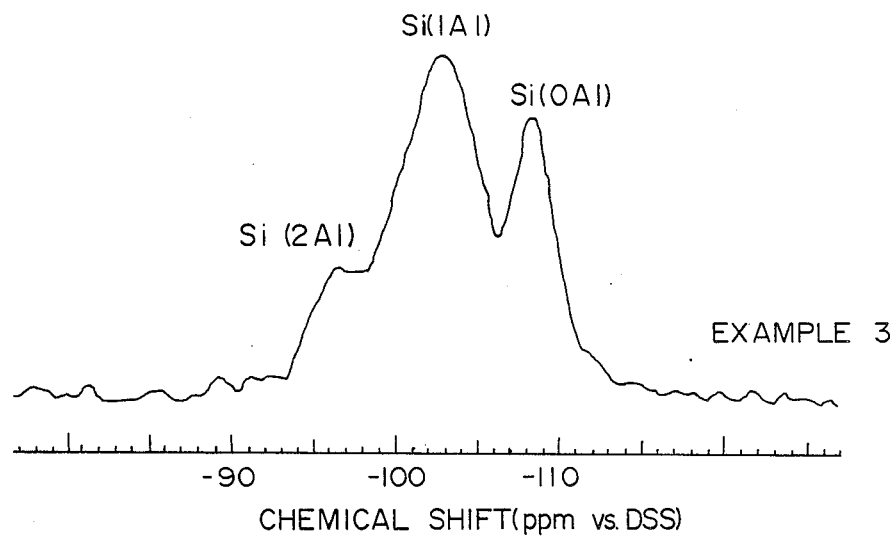
FIG. 3 shows a comparison of $^{29}Si$-MAS-NMR spectra for ECR-32 compositions made according to the examples 1 and 3.
Figure 3A:
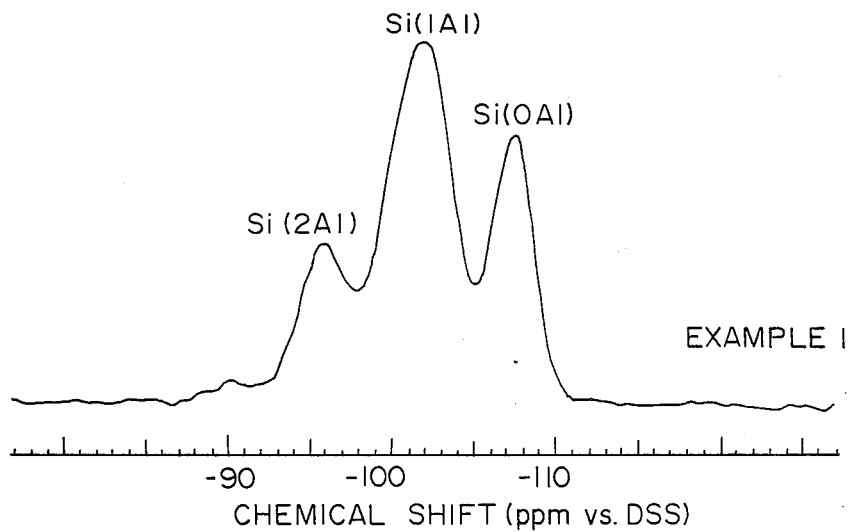

The tetrapropyl and tetrabutyl ammonium cations are relatively large ions which are not trapped within the small sodalite cages of the aluminosilicate faujasite structure, but are present in the super cages of the structure, as shown by the low temperature at which the organic template is removed from the supercage (FIG. 2).

Minor variations in the mole ratios of the oxides within the ranges given in the chemical formulas above do not substantially alter the structure or properies of the zeolite. In addition, the number of waters of hydration x in the formula will not be the same for each preparation and will depend mainly on the degree to which the aluminosilicate is dried, and the amount of template.

In order to convert the inventive high silica faujasitic zeolites into catalysts, the organic ions in the "super cage" of the zeolite are first exchanged, desorbed or degraded at high temperature. By comparison to other zeolites having ammonium ions trapped in their smaller cages, the temperature of calcination is significantly lower. As even large decomposition organic fragments may easily diffuse through the large pores of the zeolite ECR-32, bond breakage and lattice degradation associated with the escape of such fragments from the smaller cages is not observed in ECR-32.

The exchangeable cations which may partially or fully replace the sodium ions wherever they may be found and the organic ammonium ions in the large cages of the faujasite structure may be cations of metals from any one of Groups I through VIII of the Periodic Table including rare earth metals, depending on the end use desired. Preferably, the cations will be mono-, di- and trivalent metal cations, particularly from Groups I, II or III of the Periodic Table, such as barium, calcium, cesium, lithium, magnesium, potassium, strontium, zinc, or the like, or hydrogen, rare earth metals, or ammonium ions. The presence of these exchangeable cations will generally not cause a substantial alteration of the basic crystal structure of the aluminosilicate. Particularly preferred are mono- and divalent cations, as they are more easily included in the pores of the zeolite crystal Any ion exchange technique may be employed such as those discussed, for example, in U.S. Pat. No. 3,216,789.

The aluminosilicate herein may be prepared by a process in which a reaction mixture, generally a slurry, is formed comprised of an oxide of sodium, water, the organic ammonium salt, a source of silica, a source of alumina, and sodium zeolitic (aluminosilicate) nucleating seeds. The oxide of sodium may be, e.g., sodium hydroxide, and the organic ammonium salt may be a sulfate, nitrate, hydroxide or halide salt, and is preferably a halide such as the chloride, iodide or bromide salt because of lower cost. The silica may be derived from sources such as, e.g., silica gels, silicic acid, aqueous colloidal silica sols as described, for example, in U.S. Pat. No. 2,574,902, reactive amorphous solid silicas such as fume silicas and chemically precipitated silica sols, and potassium or sodium silicate, preferably sodium silicate. The alumina may be derived from sources such as, e.g., activated alumina, alumina trihydrate, sodium aluminate, alum, kaolin, metakaolin or the like. It is noted that the sodium oxide may be provided not only directly by adding, e.g., sodium hydroxide to the mixture, but also indirectly from the source of silica and/or the source of alumina if, for example, sodium silicate and sodium aluminate (prepared by dissolving NaOH and $Al_2O_3 \cdot 3H_2O$ in water) are respectively employed as at least one of the silica and alumina sources. The preferred sources of alumina are hydrated alumina and an aluminum salt selected from the chloride, sulfate and nitrate salts.

The aluminosilicate nucleating seeds for the reaction mixture, also known as zeolitic nucleation centers, comprise of a slurry of zeolite solids having the following components: $SiO_2$, $Al_2O_3$, $Na_2O$ and $H_2O$. Generally, the seeds will have an average particle size less than 0.05 microns. The composition of the nucleating seeds in the slurry may be in the approximate ranges, in terms of mole ratios of oxides, as follows:

4 to 30 $Na_2O$:1 to 9 $Al_2O_3$:3 to 30 $SiO_2$:250 to 2000 $H_2O$

Such slurries of nucleating seeds may be prepared by the process disclosed in U.S. Pat. Nos. 3,808,326 and 4,178,352, the disclosures of which are incorporated by reference. In general, the preparation procedure involves mixing of sodium silicate, sodium aluminate and water together and aging the resulting slurry at about 0° to 90° C. for about 1 to 500 hours, with lower temperatures requiring a longer period of time. Preferably, the slurry is aged at about 15° to 40° C. for about 20 to 400 hours and the zeolite centers have compositions in the range:

10 to 16 $Na_2O$:1 to 9 $Al_2O_3$:10 to 15 $SiO_2$:250 to 2000 $H_2O$.

The amount of nucleating seeds present in the reaction mixture is expressed in terms of the percentage of the total molar alumina content in the aluminosilicate product which is ultimately recovered on crystallization. Thus, for example, if 5 molar percent of the nucleating seeds is added to the mixture, the seeds are contributing 5% of the total molar amount of alumina in the zeolite product recovered. In general, the seeds are present in an amount to yield 0.1 to 20 mole percent of the total final alumina content of the product, and preferably 2 to 10 mole percent.

Slurries comprising recycled products of the process disclosed herein will also serve as nucleation seeds.

The relative amounts of ingredients in the reaction mixture will be such that the mixture has a composition, in terms of mole ratios of oxides, within the following ranges:

| Oxide Constituents | Ranges of Mole Ratios |
| --- | --- |
| $(Na,T)_2O:Al_2O_3$ | 3 to 15 |
| $SiO_2:Al_2O_3$ | 9 to 36 |
| $H_2O:Al_2O_3$ | 120 to 500 | where T represents an organic ammonium group as described above. Preferably, the mole ratio of $H_2O$ to $Al_2O_3$ in the reaction mixture ranges from 200 to 400, and the mole ratio of $SiO_2$ to $Al_2O_3$ from 15 to 30.

The order of mixing the ingredients is not essential, and all ingredients may be added simultaneously. In one preferred method of preparation a colloidal silica solution, a slurry of nucleating seeds and an organic ammonium halide solution are added to a blender, followed by slow addition, with mixing, of a sodium aluminate solution and an alum solution. Additional water is added to the resulting slurry. The reaction mixture is ordinarily prepared in a container made of glass, TEFLON, or metal or the like which should be closed to prevent water loss.

After the reaction mixture is formed it may be homogenized by thorough blending so as to be substantially homogeneous in texture. This step is to ensure that the aluminosilicate product ultimately obtained is not a mixture of products and thus impure. The mixing may take place in any vessel in which complete mixing is effected, e.g., a blender, in line pump or other highly agitated system.

The homogenized mixture is then placed in a reactor, ordinarily one which can withstand elevated pressures such as a tetrafluoroethylene-lined jar or an autoclave, where it is maintained at a temperature of between about 90° C. and 160° C., preferably 90° and 140° C., For commercial purposes, preferably no greater than 140° C. The exact temperature will depend, for example, on the amount of sodium oxide present and the length of time employed for reaction. At temperatures above about 120° C., the zeolites obtained are no longer in substantially pure form. When the homogenized mixture is heated it is maintained at autogenous pressures which will depend on the temperature employed. Lower pressures of 1 atm may be adequate for temperatures at the lower range but at higher temperatures up to 160° C. pressures of up to about 3 to 10 atm or higher may be achieved. The amount of time required for heating will depend mainly on the temperature employed, so that at 100° C. the heating may be carried out, e.g., for up to 80 days or more, whereas at, e.g., 120° C. or more the time period may be, e.g., 4 to 15 days. In any event, the heating is carried out until crystals are formed of the aluminosilicate zeolite product, i.e., ECR-32, having a faujasite structure, a mole ratio of $SiO_2/Al_2O_3$ of at least six and the presence of organic ammonium templates removable below about 400° C. as shown by thermogravimetric analysis.

The crystallization time may be shortened, if desired, by seeding the slurry before or after the blending step with minor amounts of zeolite ECR-32 crystals of this invention which are preferably chopped at low temperatures and a size range less than about 0.05 before that seeding.

When the aluminosilicate crystals have been obtained in sufficient amount, they are recovered by centrifugation or filtration from the reaction mixture and are then washed, preferably with deionized water, to separate them from the mother liquor. The washing should continue, for best purity results, until the wash water, equilibrated with the product, has a pH of between about 9 and 12. After the washing step the zeolite crystals may be dried as in a kiln.

The aluminosilicate ECR-32 of this invention may be used as a sorbent or as a catalyst, e.g., in a hydrocarbon conversion process such as in paraffin isomerization, aromatization, and alkylation and in the reforming, hydrocracking and cracking of lube stocks, fuels and crude oils. To be employed for these applications, the aluminosilicate may be at least partially dehydrated by drying at temperatures of up to about 500° C. or more until most or all of the water of hydration is removed.

ANALYTICAL PROCEDURES

A zeolite may be definitively identified by its x-ray diffraction pattern and chemical composition obtained by a variety of bulk chemical analyses. The unit cell measurement for various faujasites, in particular, has become a measurement (ASTM method D-3942-80) standardized to reflect the Si/Al ratio of the pure sodium form synthetic faujasite, e.g., D. W. Breck and E. M. Flanigen, "Molecular Sieves", Society of Chemistry and Industry, London, p. 47 (1968); E. Dempsey et al, J. Phys. Chem., 73, (1968), p. 387. Unfortunately, substitution of cations other than Na+ into faujasite renders the established "unit cell vs composition" relationships valueless. Since ECR-32 contains organic cations in addition to Na+, unit cell correlations obtained by these methods have little value, until the said ECR-32 is first purged of the organic template, then sodium exchanged. Such values for Na-ECR-32 are included in the examples Na-ECR-32 may be defined by the following essential diffraction lines.

TABLE A

| MAJOR X-RAY DIFFRACTION PEAKS FOR ECR-32 | |
|---|---|
| d Spacing (Å) | Relative Intensity |
| 14.05–14.20 | VS |
| 8.60–8.70 | M |
| 7.32–7.44 | W |
| 7.00–7.15 | W |
| 5.58–5.65 | S |
| 4.68–4.75 | M |
| 4.30–4.35 | M |
| 3.85–3.90 | W |
| 3.70–3.75 | M-S |
| 3.40–3.45 | W |
| 3.25–3.30 | M |
| 2.97–3.05 | W |
| 2.87–2.90 | M-W |
| 2.81–2.84 | M |
| 2.72–2.75 | W |
| 2.59–2.63 | W |
| 2.34–2.37 | W |

(VS = 100–80; S = 80–40; M = 40–15; W = 3–15 in absolute value ranges)

A valuable indirect measurement of Si/Al ratio has been developed recently which, to a first approximation, is not significantly influenced by variable cations contents. Known as $^{29}$Si- magic angle spinning nuclear magnetic resonance (MSA-NMR), it measures the relative number of Si atoms surrounded by 4 Al, (3Al+1l), (2Al+2Si), (1Al+3 Si) and 4Si, from which the total average Si/Al ratio can be readily calculated (melchior et al, J. Amer. Chem. Soc., v. 104, p. 4859 (1982)). Compared with the conventional Y faujasite, ECR-32 compositions may clearly be differentiated on the basis of relative peak values, vis., in the case of ECR-32 the number of Si atoms having zero and one Al neighbors is greater than the number of Si atoms having 2 and 3 Al neighbors. For zeolite Y the reverse is true.

ECR-32: Si(0Al)+Si(1Al)>Si(2Al)+Si(3Al)

Zeolite Y: Si(0Al)+Si(1Al)<Si(2Al)+Si(3Al).

It should be apparent that $^{29}$Si-MAS-NMR spectra give a more reliable indication of the number of Si and Al atoms in a sample then would a comparable bulk chemical test. The MAS-NMR ignores detrital or adsorbed and dissolved silicon and aluminum atoms since it measures those atoms only when they are in particular spatial relationship to each other. Bulk chemical tests have no way to make such a differentiation.

A further differentiating characteristic of ECR-32 is that the organic template is located in the "super cage" rather than the smaller sodalite cage. Although this can be demonstrated using $^{13}$C-MAS-NMR, it is also readily demonstrated by a simple thermogravimetric experiment in which a small sample is heated in a controlled fashion.

Typical weight loss curves as a function of temperature are shown in FIG. 2 for ECR-32 containing tetrapropyl ammonium in the faujasite super cage. The low temperature weight loss (340° C.) corresponding to the tetrapropyl ammonium release from the large faujasite cage is in distinct comparison with the high temperature weight loss (560° C.) characteristic of release of a smaller tetramethyl ammonium template from a small cage in faujasite or mazzite.

EXAMPLES

The examples which follow illustrate the efficacy of the invention. In all examples, parts and percentages are given by weight and temperatures in degrees Centigrade unless otherwise noted.

EXAMPLE 1

A reaction mixture having the following oxide composition:

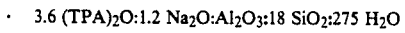

Figure 1:
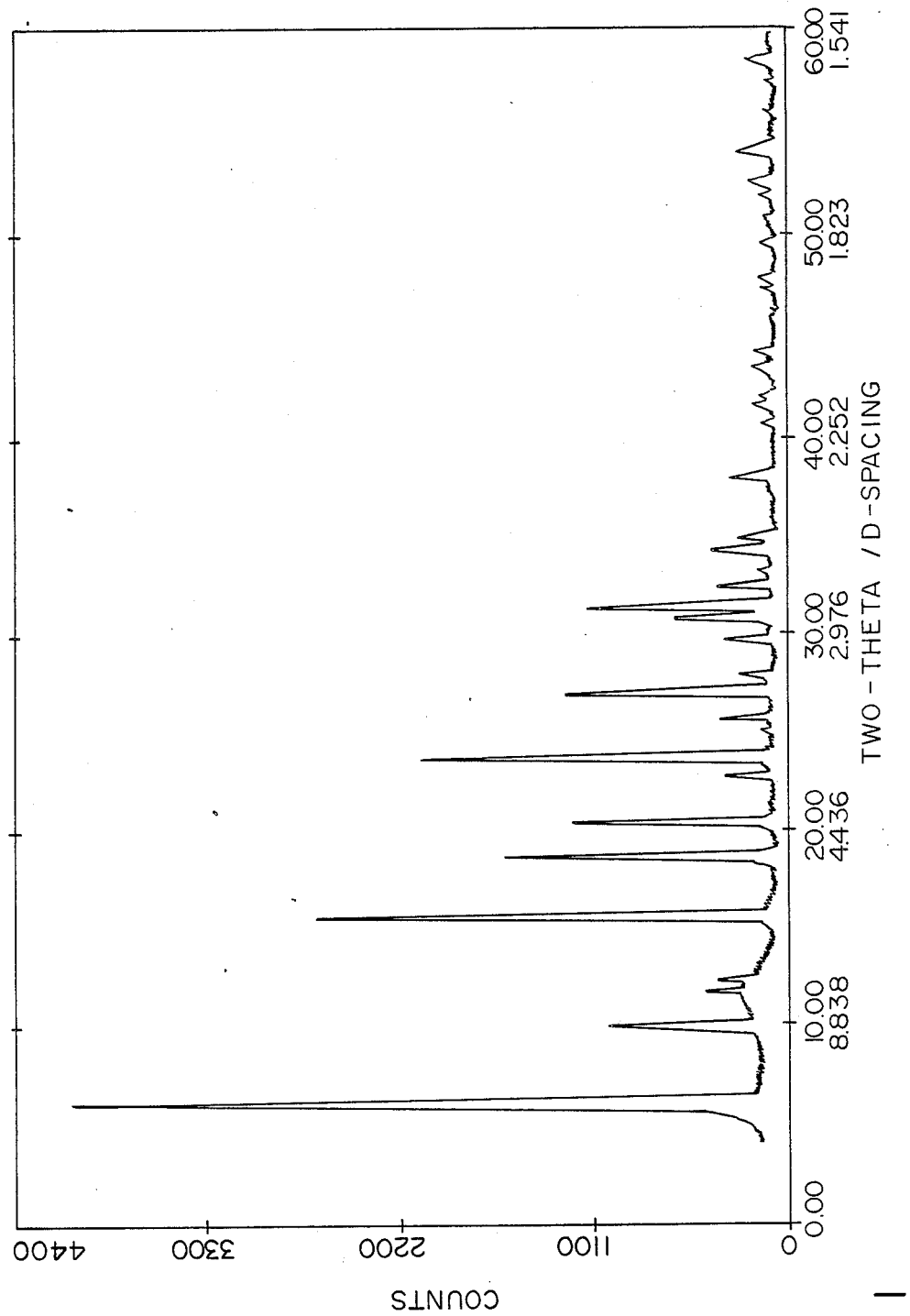
FIG. 1 shows a typical x-ray diffraction spectrum for ECR-32.

3.6 (TPA)$_2$O:1.2 Na$_2$O:Al$_2$O$_3$:18 SiO$_2$:275 H$_2$O was made by first making a sodium aluminate solution by dissolving 9.0 gm NaOH and 11.5 gm aluminum oxide trihydrate in 15 mls H$_2$O. In a two liter plastic beaker were mixed 324.1 gm Ludox HS-40 silica (DuPont Co.), 83.6 gm of a "seed" solution (13.3 Na$_2$O:Al$_2$O$_3$:12.5 SiO$_2$:267 H$_2$O, see U.S. Pat. Nos. 3,574,538 and 4,340,573), 471.6gm of a 40% aqueous solution of tetra n-propylammonium hydroxide, sodium aluminate solution, and 27.5 gm of Al2(SO4)3.17H$_2$O dissolved in 30 mls H$_2$O. The total weight of the mixture was adjusted to 1000 gm by the addition of distilled H$_2$O, and then thoroughly homogenized in a blender. The white slurry was placed in a teflon bottle and then reacted in an air oven at 100° C. for 8 days. The product was recovered by filtration, washed with distilled water and dried in an 115° C. oven. Analysis by x-ray powder diffraction, as listed in Table 1 and shown in FIG. 1, showed the sample to be excellent ECR-32. Thermogravametric analysis showed a TPA weight loss of 13.5% at 358° C. and 570° C. and a total TPA plus H$_2$O loss of 22.3%. Elemental analysis by ICP-AES gave an overall chemical composition of:

0.35 (TPA)$_2$O:0.68 Na$_2$O:Al$_2$O$_3$:9.5 SiO$_2$

A portion of this sample was calcined in air at 600° C. for 4 hours. The calcined sample absorbed 19.5% n-hexane at 45 torr. Exchange of this calcined sample with sodium chloride solution yielded a product having a cubic unit cell of 24.48 Å, using the method of ASTM-D3942-80.

TABLE 1

| No. | 2-Theta | d | Relative Intensity |
|---|---|---|---|
| 1 | 6.26 | 14.12 | 100 |
| 2 | 10.20 | 8.67 | 20 |
| 3 | 11.94 | 7.41 | 7 |
| 4 | 12.49 | 7.08 | 7 |
| 5 | 15.73 | 5.63 | 58 |
| 6 | 18.77 | 4.723 | 34 |
| 7 | 20.45 | 4.339 | 25 |
| 8 | 22.91 | 3.878 | 8 |
| 9 | 23.77 | 3.740 | 48 |
| 10 | 25.94 | 3.433 | 8 |
| 11 | 27.19 | 3.276 | 30 |
| 12 | 27.92 | 3.193 | 6 |
| 13 | 29.79 | 2.996 | 8 |
| 14 | 30.92 | 2.890 | 15 |
| 15 | 31.57 | 2.831 | 29 |
| 16 | 32.65 | 2.740 | 8 |
| 17 | 33.30 | 2.688 | 4 |
| 18 | 34.28 | 2.614 | 9 |
| 19 | 34.89 | 2.570 | 6 |
| 20 | 38.12 | 2.359 | 9 |
| 21 | 40.77 | 2.211 | 3 |
| 22 | 41.66 | 2.166 | 4 |
| 23 | 42.19 | 2.140 | 3 |
| 24 | 43.50 | 2.079 | 5 |
| 25 | 44.32 | 2.042 | 4 |
| 26 | 46.08 | 1.968 | 2 |
| 27 | 47.46 | 1.914 | 2 |
| 28 | 48.10 | 1.890 | 5 |
| 29 | 49.73 | 1.832 | 4 |
| 30 | 50.89 | 1.793 | 3 |
| 31 | 52.08 | 1.755 | 3 |
| 32 | 52.78 | 1.733 | 6 |
| 33 | 54.35 | 1.687 | 8 |
| 34 | 56.13 | 1.637 | 3 |
| 35 | 57.72 | 1.596 | 2 |
| 36 | 58.66 | 1.573 | 6 |

EXAMPLE 2

A reaction mixture having the following oxide composition:

4.8 (TPA)$_2$O:1.6 Na$_2$O:Al$_2$O$_3$:24 SiO$_2$:350 H$_2$O was made by first making a sodium aluminate solution by dissolving 27.6 gm NaOH and 35.0 gm aluminum oxide trihydrate in 35 mls H$_2$O. This was diluted with H$_2$O to a final weight of 121.5 gm. In a 250 ml plastic beaker were mixed 43.02 gm Ludox HS-40 silica (DuPont Co.), 8.17 gm of a "seed" solution (13.33 Na$_2$O:Al$_2$O$_3$:12.5 SiO$_2$:267 H2O, see U.S. Pat. Nos. 3,574,538 and 4,340,573), 61.44 gm of a 40% aqueous solution of tetra n-propylammonium hydroxide, 4.48 gm of sodium aluminate solution, and 1.94 gm of Al$_2$(S04)$_3$:17 H$_2$O dissolved in 2.31 mls H$_2$O. The total weight of the mixture was adjusted to 125 gm by the addition of distilled H$_2$O and then thoroughly homogenized in a blender. The white slurry was placed in a teflon bottle and then reacted in an air oven at 100° C. for 58 days. The product was recovered by filtration, washed with distilled water and dried in an 115° C. oven. Analysis by x-ray powder diffraction showed the sample to be excellent ECR-32 with a minor impurity. Thermogravametric analysis showed a TPA weight loss of 15.7% at 365° C. and 580° C. and a total TPA plus H$_2$O loss of 22.6%. Elemental analysis by ICP-AES gave an overall chemical composition of:

0.45 (TPA)$_2$O:0.44 Na$_2$O:Al$_2$O$_3$:11.16 SiO$_2$

A portion of this sample was calcined in air at 600° C. for 4 hours. The calcined sample absorbed 19.3% n-hexane at 45 torr. Exchange of this calcined sample with sodium chloride solution yielded a material having a cubic unit cell of 24.45 Å.

EXAMPLE 3

A reaction mixture having the following oxide composition:

3.6 (TBA)$_2$O:1.2 Na$_2$O:Al$_2$O$_3$:18 SiO$_2$:300 H$_2$O was made by first making a sodium aluminate solution by heating 7.85 gm. NaOH and 10.0 gm. aluminum oxide trihydrate in 13 mls H$_2$O until the alumina dissolved. This solution was diluted to 33.8 g. with distilled water. In a 600 ml. plastic beaker were mixed 80.3 gm. Ludox HS-40 silica (DuPont Co.), 20.7 gm. of a "seed" solution (13.33 Na$_2$O:Al$_2$O$_3$:12.5 SiO$_2$:267 H$_2$O, see U.S. Pat. Nos. 3,574,538 and 4,340,573). 149.0 gm. of a 40% aqueous solution of tetra n-butylammonium hydroxide, 9.6 grams of sodium aluminate solution, and 6.82 gm. of Al$_2$(SO$_4$)$_3$:17 H$_2$O dissolved in 8.4 mls. H$_2$O. The total weight of the mixture was adjusted to 275 gm with H$_2$O and thoroughly homogenized in a blender. The white slurry was placed in a teflon bottle and then reacted in an air oven at 100° C. for 25 days. The product was recovered by filtration, washed with distilled water and dried in an 115° C. oven. Analysis by X-ray powder diffraction, as listed in Table 2, showed the sample to be excellent ECR-32. Thermogravametric analysis showed a TBA weight loss of 14.1% at 325° and 556° C. burn off of residual carbon, and a total TBA plus H$_2$O loss of 22.8%. Elemental analysis by ICP-AES gave an overall chemical composition of:

0.25 (TBA)$_2$O: 0.60 Na$_2$O:Al$_2$O$_3$:8.48 SiO$_2$

A portion of this sample was calcined in air at 600° C. for 4 hours. The calcined sample absorbed 20.0% n-hexane at 45 torr. Exchange of this calcined sample with sodium chloride solution yielded a product having a cubic unit cell of 24.51 Å.

TABLE 2

| No. | 2-Theta | d | Relative Intensity |
|---|---|---|---|
| 1 | 6.23 | 14.19 | 100 |
| 2 | 10.17 | 8.69 | 19 |
| 3 | 11.93 | 7.41 | 6 |
| 4 | 12.45 | 7.10 | 4 |
| 5 | 15.70 | 5.64 | 31 |
| 6 | 18.75 | 4.73 | 18 |
| 7 | 20.43 | 4.342 | 18 |
| 8 | 21.72 | 4.088 | 3 |
| 9 | 22.87 | 3.886 | 7 |
| 10 | 23.73 | 3.747 | 36 |
| 11 | 25.88 | 3.440 | 5 |
| 12 | 27.14 | 3.283 | 20 |
| 13 | 28.04 | 3.180 | 7 |
| 14 | 29.74 | 3.001 | 5 |
| 15 | 30.85 | 2.896 | 9 |
| 16 | 31.50 | 2.837 | 17 |

TABLE 2-continued

| No. | 2-Theta | d | Relative Intensity |
|---|---|---|---|
| 17 | 32.57 | 2.747 | 6 |
| 18 | 33.37 | 2.683 | 3 |
| 19 | 34.21 | 2.619 | 5 |
| 20 | 34.79 | 2.577 | 4 |
| 21 | 38.02 | 2.365 | 5 |
| 22 | 40.70 | 2.215 | 2 |
| 23 | 41.56 | 2.171 | 3 |
| 24 | 43.41 | 2.083 | 4 |
| 25 | 44.23 | 2.046 | 4 |
| 26 | 44.98 | 2.014 | 3 |
| 27 | 50.78 | 1.796 | 2 |
| 28 | 52.65 | 1.737 | 3 |
| 29 | 54.22 | 1.576 | 4 |
| 30 | 58.51 | 1.576 | 4 |

What is claimed is:

1. A process for preparing an aluminosilicate having a faujasite structure and a composition, in terms of mole ratios of oxides, in the range:

0.2 to 0.80 $T_2O$:0.20 to 0.8 $Na_2O$:$Al_2O_3$:6 to 15 $SiO_2$:$xH_2O$ wherein T represents an organic ammonium template trapped in supercages of said zeolite and x represents O or an integer from 1 to 20, wherein said process comprises:

(a) preparing a reaction mixture comprising an oxide of sodium, a tetrapropyl or tetra hydroxypropyl or tetrabutyl or tetra hydroxy-butyl organic ammonium salt, water, a source of silica, a source of alumina, and sodium aluminosilicate nucleating seeds, said reaction mixture having a composition, in terms of mole ratios of oxides, within the following ranges:

| (Na,T)$_2$O:Al$_2$O$_3$ | 3 to 15 |
|---|---|
| SiO$_2$:Al$_2$O$_3$ | 9 to 36 |
| H$_2$O:Al$_2$O$_3$ | 120 to 500 | where T represents the cation of the organic ammonium template, and said seeds being present in an amount to yield 0.1 to 10 mole percent of the total final alumina content in said aluminosilicate;

(b) blending the reaction mixture sufficiently to substantially form a mixture;

(c) maintaining the reaction mixture at between about 90° C. and 160° C. under autogeneous pressure for a sufficient period of time to form crystals of said aluminosilicate; and (d) recovering said aluminosilicate crystals.

2. The process of claim 1 wherein the source of silica is a colloidal silica and the sources of alumina are hydrated alumina and an aluminum salt selected from the group consisting of the chloride, sulfate and nitrate salts.

3. The process of claim 2 wherein the reaction mixture is maintained between 90° and 140° C.

4. The process of claim 2 wherein the seeds are present in an amount to yield 0.1 to 10 mole percent of the total final alumina content.

5. A process for preparing an aluminosilicate having a faujasite structure, a silica to alumina mole ratio of at least six, and tetrapropyl or tetrabutyl ammonium ions within the super cages of said aluminosilicate which comprises the steps of:

(a) preparing a reaction mixture comprising sodium aluminate, alum, water, sodium silicate, aluminum sulfate, tetrapropyl or tetrabutyl ammonium hydroxide or halide and nucleating seeds of about the composition 13.33 Na$_2$O:Al$_2$O$_3$:15 SiO$_2$:320 H$_2$O, said reaction mixture having a composition, in terms of mole ratios of oxides, within the following ranges:

| (Na,T)$_2$O:Al$_2$O$_3$ | 4 to 8 |
|---|---|
| SiO$_2$:Al$_2$O$_3$ | 15 to 30 |
| H$_2$O:Al$_2$O$_3$ | 120 to 450 | wherein T represents tetrapropyl or tetrabutyl ammonium and said seeds being present in an amount to yield 0.1 to 10 mole percent of the total final alumina content in said aluminosilicate;

(b) blending the reaction mixture sufficiently to form a substantially homogeneous mixture;

(c) maintaining the reaction mixture between 90° C. and 130° C. under autogenous pressure for a sufficient period of time to form crystals of said aluminosilicate; and (d) recovering said aluminosilicate crystals.

6. A process of claim 5 in which the organic template is a tetrabutyl ammonium salt.

7. A process of claim 5 in which the organic template comprises a mixture of tetrapropyl and tetrabutyl ammonium salts.

8. The processes of claim 5 wherein the aluminosilicate has a composition, in terms of mole ratio of oxides, in the range:

0.2 to 0.80 $T_2O$:0.2 to 0.8 $Na_2O$:$Al_2O_3$:8 to 12 $SiO_2$:$xH_2O$ wherein T represents a tetrapropyl or tetrabutyl ammonium group and x represents 0 or an integer from 1 to 25.

* * * * *